O. HEBERT.
HEATER FOR STOCK WATERING TANKS.
APPLICATION FILED NOV. 22, 1909.
974,060.
Patented Oct. 25, 1910.
2 SHEETS—SHEET 2.
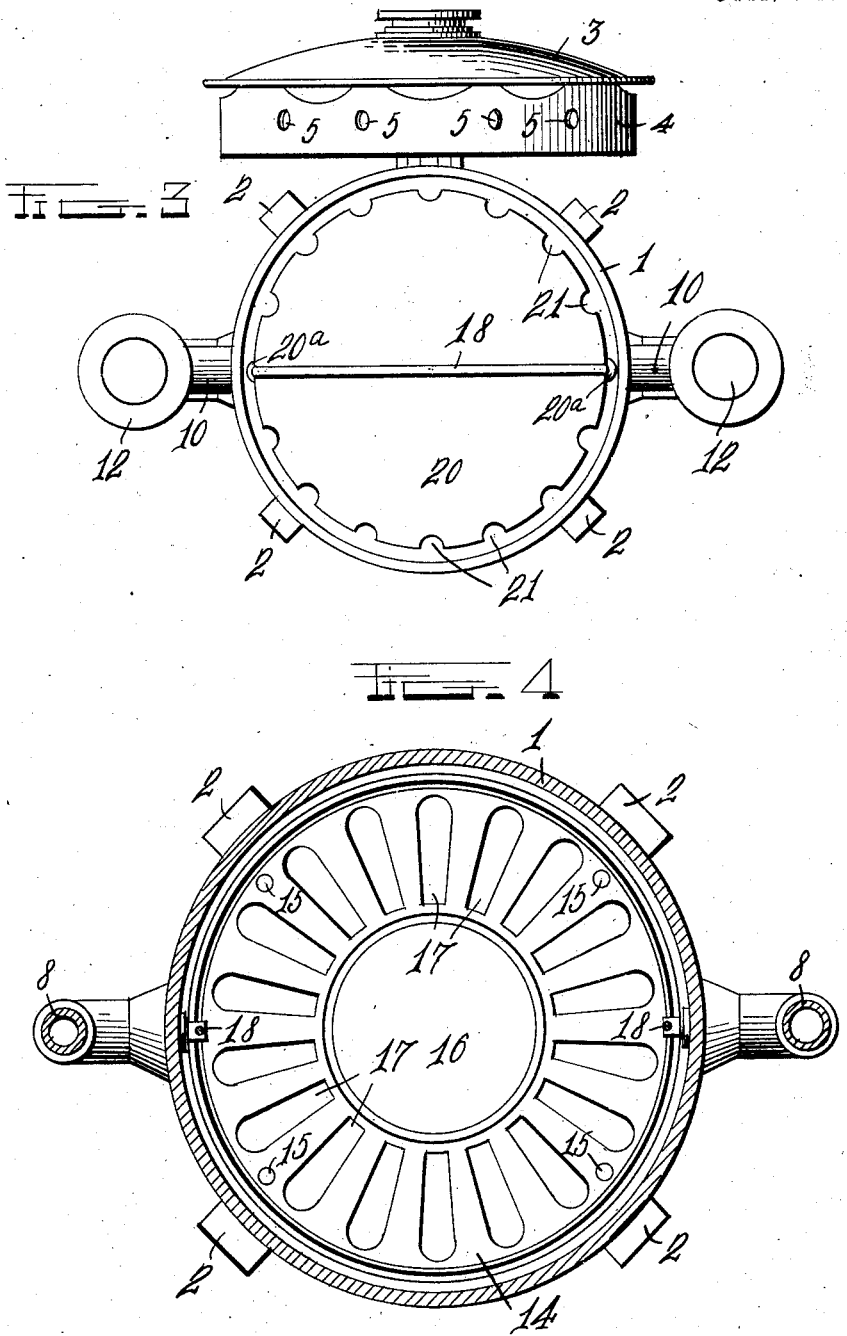

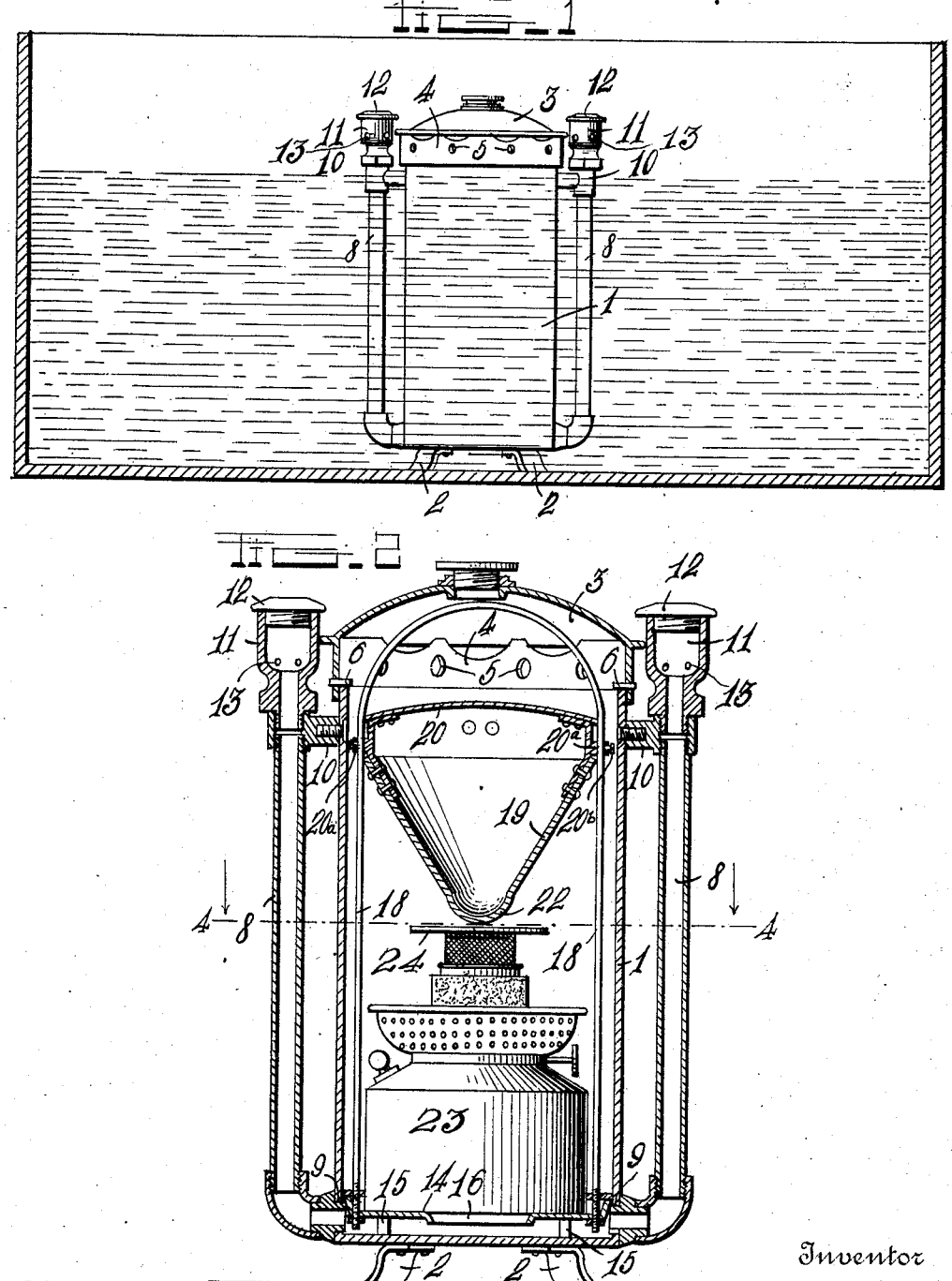

UNITED STATES PATENT OFFICE.

OLIVER HEBERT, OF OSWEGO, ILLINOIS.

HEATER FOR STOCK-WATERING TANKS.

974,060.  Specification of Letters Patent.  Patented Oct. 25, 1910.

Application filed November 22, 1909. Serial No. 529,268.

*To all whom it may concern:*

Be it known that I, OLIVER HEBERT, a citizen of the United States, residing at Oswego, in the county of Kendall and State of Illinois, have invented certain new and useful Improvements in Heaters for Stock-Watering Tanks; and I do declare the following to be a full, clear, and exact description of the invention, such as will enable others skilled in the art to which it appertains to make and use the same.

This invention relates to improvements in heating devices for stock watering tanks.

One object of the invention is to provide a simple and inexpensive device of this character in which an oil lamp may be employed to furnish the necessary heat, means being provided whereby the proper air draft is supplied to the lamp.

Another object of the invention is to provide a device of this character having means whereby the flame of the lamp will be spread and deflected and a maximum amount of heat radiation thus obtained from the lamp, thereby providing for a saving of fuel.

With the foregoing and other objects in view, the invention consists of certain novel features of construction, combination and arrangement of parts, as will be more fully described and particularly pointed out in the appended claims.

In the accompanying drawings, Figure 1 is a vertical sectional view of a tank showing my improved heater arranged therein, the latter being shown in side elevation; Fig. 2 is a central vertical sectional view of the heater; Fig. 3 is a top plan view of the heater with the cover removed and parts shown in section; Fig. 4 is a horizontal sectional view on the line 4—4 of Fig. 2 with the lamp removed.

In the embodiment of the invention, I provide a casing 1 which is constructed of non-corrosive material and may be of any suitable shape, the same being here shown and is preferably of cylindrical form. The casing is closed at its lower end and supported upon suitable feet 2 which rest on the bottom of the watering tank and hold the casing a slight distance above the same.

The upper open end of the casing is closed by a cover 3 which is preferably hinged to the casing and is provided with a downwardly projecting annular flange 4 in which is formed a series of air passages or ventilating openings 5. The flange 4 is provided with inwardly projecting stop pins 6 which, when the cover is closed, are adapted to engage the upper edge of the casing, thus preventing the cover from closing down on the casing far enough to close the air passages 5.

Arranged at diametrically opposite points on the outer side of the casing 1 are air conducting tubes 8, the lower ends of which communicate with suitable openings 9 formed in the opposite sides of the casing near the bottom of the same. The tubes 8 are held in place at their upper ends by short brace bars 10, which connect the tubes with the casing as shown. On the upper ends of the tubes 8 are screwed or otherwise secured air receiving cups 11, which are normally closed at their upper ends by threaded plugs 12 and have formed near their lower ends air inlet passages 13, through which air passes and is conducted by the tubes 8 to the lower portion of the casing 1, thus creating a draft through the casing and air passages 5 at the upper ends of the same. The plugs 12 exclude the entrance of any dirt or other foreign matter into the air cups, and prevent a too liberal supply of air to the tubes 8.

Arranged in the casing 1 is a lamp supporting and deflecting frame comprising a flanged lamp receiving plate 14 provided on its lower side with suitable supporting feet 15 whereby the same is held above the bottom of the casing 1. The plate 14 is preferably provided with a circular opening 16 and an annular series of radial openings 17. To the plate at diametrically opposite points are connected the lower ends of a supporting and carrying bail 18, in the upper portion of which is secured an inverted cone or funnel shaped heat deflector 19, over which and spaced a suitable distance therefrom is a heat deflecting disk or plate 20.

The disk or plate is of slightly less diameter than the inside of the casing 1 and in the outer edge of the plate is formed a series of notches 21. The lower end of the funnel shaped deflector 19 is provided with the cup-shaped reinforcement 22 which protects the lower end of the deflector from the intense heat of the lamp. The funnel shaped deflector 19 and the deflecting disk 20 are preferably connected together and spaced apart by connecting plates on which are secured apertured lugs 20ª, which are slidably engaged with the bail 18 and are adjustably secured thereto by set screws 20ᵇ whereby said deflecting devices may be adjusted to bring the same nearer to or farther from the flame of the lamp, thereby regulating the deflection of the flame and radiation of the heat.

Adapted to rest on the plate 14 immediately below the deflector 19 is a heating lamp 23, which may be of any suitable construction, but which is preferably of the round burner type and is provided with a spreader 24, whereby the flame is spread or thrown out around the deflector 19. The deflector 19 and the deflecting plate 20 serve to radiate and diffuse the heat through the casing 1 from which it is radiated into the water of the tank.

By providing the perforated air cups 11 and the air conducting tubes 8, the proper air draft is supplied below the burner of the lamp to insure the proper burning of the latter, it being understood that the apertured cups, as well as the perforated top of the casing, are arranged above the water level of the tank or trough.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:—

1. A tank heater comprising a casing, a perforated cover for the casing, a heating lamp mounted in the bottom of the casing, air conducting tubes communicating with the bottom of the casing, a supporting frame for the lamp comprising a vertical bail shaped member and a heat deflecting and radiating device adjustably mounted on the bail shaped member of the lamp supporting frame above the lamp.

2. A tank heater comprising a casing, a perforated cover for the casing, a heating lamp mounted in the bottom of the casing, air conducting tubes communicating with the bottom of the casing, a supporting frame for the lamp comprising a vertical bail shaped member and a heat deflecting and radiating device adjustably mounted on the bail shaped member of the lamp supporting frame above the lamp, said heat deflecting and radiating member comprising an approximately disk shaped top portion formed with peripheral notches and of less diameter than the interior diameter of the casing and a depending cone-shaped portion.

In testimony whereof I have hereunto set my hand in presence of two subscribing witnesses.

OLIVER HEBERT.

Witnesses:
 Lewis P. Voss,
 C. E. Fowler.